Figure 1:
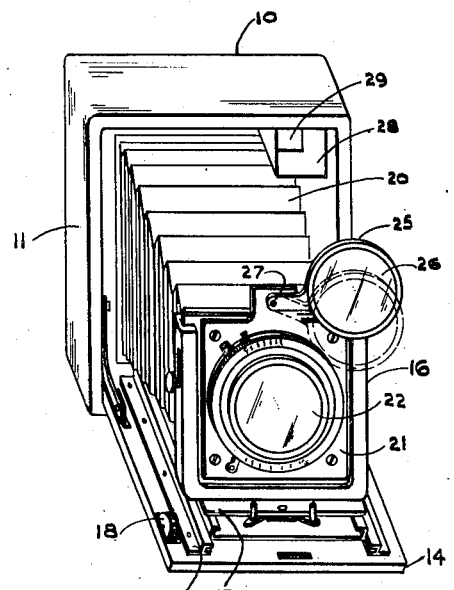

May 12, 1942.   J. A. MAURER, JR   2,283,077
CAMERA FOCUSING DEVICE
Filed May 29, 1941   2 Sheets-Sheet 1

INVENTOR.
JOHN A. MAURER, JR.
BY Abe Offner
AGENT.

May 12, 1942.   J. A. MAURER, JR   2,283,077
CAMERA FOCUSING DEVICE
Filed May 29, 1941   2 Sheets-Sheet 2

INVENTOR.
JOHN A. MAURER, JR.

by Abe Offner
AGENT.

Patented May 12, 1942

2,283,077

UNITED STATES PATENT OFFICE 2,283,077

CAMERA FOCUSING DEVICE

John A. Maurer, Jr., New York, N. Y., assignor to J. A. Maurer, Inc., New York, N. Y., a corporation of New York Application May 29, 1941, Serial No. 395,725

3 Claims. (Cl. 95—44)

This invention relates to photographic apparatus and more particularly, to cameras and to improvements in focusing devices therefor.

There is a large class of cameras in which the photographic objective is mounted on a lens board that is movable towards and away from the camera focal plane for focusing the camera. The better grade cameras of this class are adapted to employ interchangeable photographic objectives differing in focal length, thereby increasing their versatility and usefulness. Since such cameras employ large aperture lenses whose depth of focus is relatively small, they must be focused accurately if a sharp image is to be achieved. These cameras have hitherto had the drawback that there was no satisfactory focusing device that could be employed with all of the several photographic objective to focus the cameras accurately.

It is an object of the invention to provide in cameras of the class described, a focusing device that can be employed with all of the interchangeable objectives which the camera is adapted to utilize.

Another object of the invention is the provision of a focusing device of this character which is extremely accurate.

Another object of the invention is the provision of a camera focusing device of simple and economical construction.

Another object of the invention is the provision of a camera focusing device which is free from mechanical adjustments and which therefore does not need servicing.

Another object of the invention is the provision of a focusing device of this character which can easily be incorporated in the design of a camera.

Another object of the invention is the provision of a focusing device of this character which can readily be attached to a camera.

Another object of the invention is the provision of a focusing device of this character which is compact so that it can be incorporated in, or attached to, folding cameras without objectionably increasing the size of the camera, and which does not interfere with the closing of the camera.

Another object of the invention is the provision of a focusing device by means of which cameras of the class described can be focused quickly and easily.

Another object of the invention is the provision of a focusing device of this character which is especially suited for use with revolving back cameras.

Still other objects and advantages of the invention include those which are hereinafter stated or apparent, or which are incidental to the invention.

The objects of the invention are achieved as follows: In a camera whose photographic objective is mounted on a lens board that is movable towards and away from the camera body, there is provided a focusing lens having the same focal length as the photographic objective and supported by the lens board for operation substantially in the plane of the photographic objective. The camera body is adapted to support a sensitized element in the focal plane of the camera so that moving the lens board towards and away from the camera body focuses the camera on objects at various distances from the photographic objective. A screen which is small compared to the sensitized element is attached to the camera body, and means are provided for directing light from the focusing lens to the screen in such a manner as to make the image formed by the focusing lens on the screen both erect and correct right to left. The light directing means and the screen are arranged so that when the image appearing on the screen is most sharply defined, the camera is in focus. The screen is examined through a magnifying eyepiece which is mounted in the rear wall of the camera.

The optical systems of the focusing devices of the present invention are arranged so that it is not necessary to have a bellows or other light excluding means between the focusing lens and the portion of the focusing device which is attached to the camera body. The absence of a direct connection between the focusing lens and the rest of the focusing device, and hence between the focusing lens and the camera body, is referred to throughout the specification by saying that the focusing lens is detached from the camera body.

The invention will be better understood when the following description is considered with the accompanying drawings of certain presently preferred embodiments thereof, and its scope will be pointed out in the appended claims.

Figure 4:
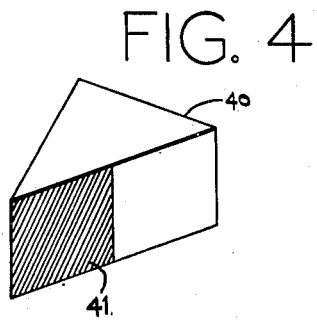
Figure 3:
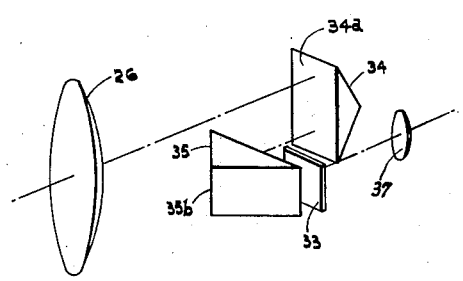
Figure 2:
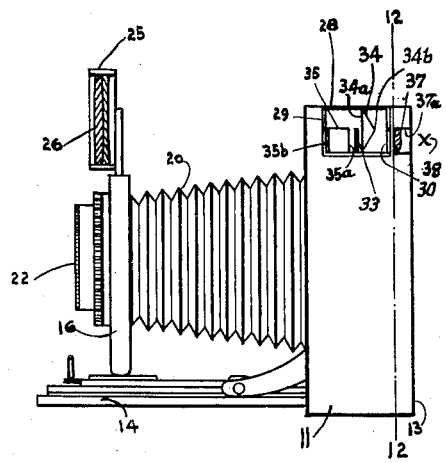
Figure 5:
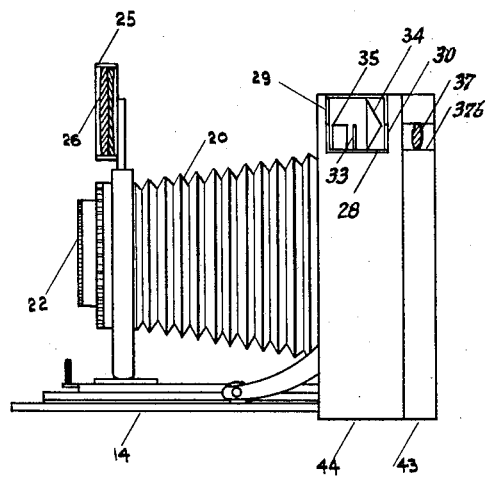
Figure 6:
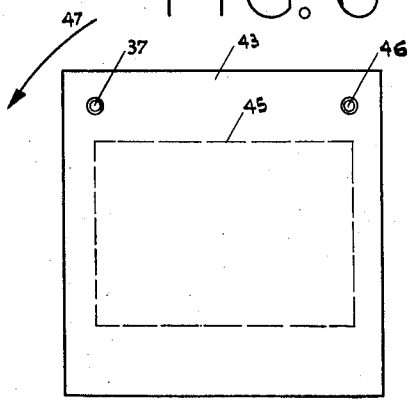
Figure 7:
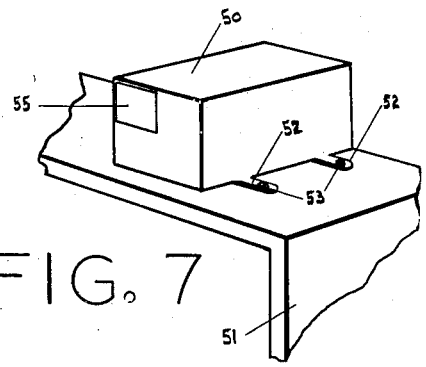
Figure 9:
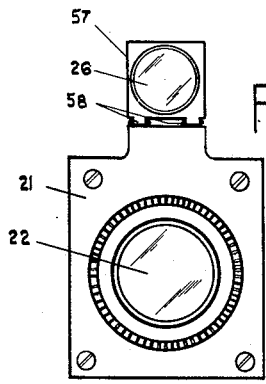
Figure 8:
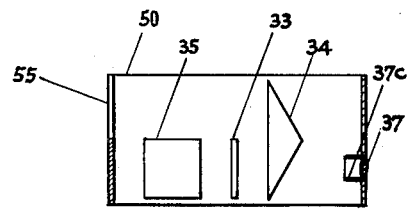

In the drawings:

Fig. 1 is a perspective view of a folding camera equipped with a focusing device in accordance with the invention, Fig. 2 is mainly a side elevation and partly a vertical section of the camera of Fig. 1, Fig. 3 is a perspective view of the optical system of the focusing device of Figs. 1 and 2, Fig. 4 is a perspective view of a modification of an element shown in Figs. 2 and 3, Fig. 5 is mainly a side elevation and partly a vertical section of a revolving back camera equipped with a focusing device in accordance with the invention, Fig. 6 is a rear elevation of the revolving back of the camera of Fig. 5, Fig. 7 is a perspective view of a part of a camera and an attached casing containing a portion of a focusing device which is another embodiment of the invention, Fig. 8 is a vertical section of the casing of Fig. 7, and Fig. 9 is a front elevation showing the lens board of the camera of Fig. 7 and a portion of the focusing device attached thereto.

In Figs. 1 and 2 there is shown a folding camera 10 having a camera body 11 adapted to support in well known manner a sensitized element such as a photographic film or plate (not shown) in the focal plane 12—12 of the camera. As indicated in Fig. 2, focal plane 12—12 is ordinarily near the rear wall 13 of camera body 11. The platform 14, when extended as shown, forms a support for the tracks 15 on which is the frame 16, carried by the carriage 17. Turning the adjusting knob 18 moves carriage 17 and frame 16 towards and away from camera body 11 along tracks 15. Frame 16 is connected to camera body 11 by the bellows 20.

Removably supported in frame 16 is the lens board 21 on which is mounted the photographic objective 22. Turning knob 18 thus focuses the camera on objects at various distances from photographic objective 22 by moving lens board 21 towards or away from camera body 11, and hence from focal plane 12—12. Frame 16 with lens board 21 is movable along tracks 15 to a position within camera body 11 so that the camera can be closed by folding platform 14 in known manner against the front of camera body 11.

The holder 25 in which is mounted the focusing lens 26 is attached to lens board 21 by the pivot 27. Lens 26 has the same focal length as photographic objective 22 and is supported substantially in the same plane as objective 22.

Supported in a corner of camera body 11 is the housing 28 having an opening 29 in its front wall and an opening 30 in its rear wall, lens holder 25 being movable about the pivot 27 so that lens 26 may be supported in a position aligned with opening 29 as shown in Fig. 1. When lens 26 is so positioned, it is supported for operation.

The screen 33 of ground glass or other light diffusing material is mounted in housing 28 parallel to focal plane 12—12. When lens 26 is supported for operation, light passing through it and through opening 29 is directed to screen 33 and to opening 30 by the Porro prisms 34 and 35. These are two right-angled prisms arranged with their hypotenuse faces 34a and 35a parallel and their right angled edges 34b and 35b in perpendicular azimuths. Light rays passing through lens 26 are displaced in a direction perpendicular to edge 34b by prism 34 and in a direction perpendicular to edge 35b by prism 35 as indicated by the broken line in Fig. 3. The portion of face 35a through which light rays from lens 26 leave prism 35 is referred to hereinbelow as the portion of the prism face farthest from lens 26, since this is the prism face portion farthest from lens 26 along the optical path.

Thus an image of a portion of the object to be photographed is formed by leans 26 on screen 33. The entire object to be photographed is not imaged on screen 33 because screen 33 is small compared to the sensitized element which is supported in focal plane 12—12 when a photograph is to be taken. The image formed by lens 26 is inverted and reversed right to left. Prism 34 reinverts this image leaving it reversed right to left, and prism 35 reverses it so that the image formed on screen 33 is erect and correct right to left. Prisms 34 and 35 thus serve to erect and right the image on screen 33. Throughout this specification, changing an inverted, reversed image to an erect image which is correct right to left is called erecting and righting the image.

Prisms 34 and 35 have been shown in Fig. 2 as so oriented that edge 34b is horizontal and edge 35b is vertical. This has been done by way of example only since the objects of the invention are also attained when edge 34b is vertical and edge 35b is horizontal, or when edges 34b and 35b are arranged in any other mutually perpendicular azimuths in planes parallel to focal plane 12—12, provided that the prisms 34 and 35 direct light from lens 26 to screen 33. In all of these cases prisms 34 and 35 erect and right the image formed by focusing lens 26 on screen 33.

Screen 33 and the image formed thereon by lens 26 are examined through the magnifying eyepiece 37 which is conveniently mounted in the opening 37a in the rear wall 13 of camera body 11 in alignment with opening 30 in housing 28. Eyepiece 37 preferably has a fairly high magnifying power so that the differences in the eye adaptations of the users have little effect on the focus of the eyepiece. The eye point 38 at which eyepiece 37 forms an image of lens 26 is the position of the observer's eye for which the image on screen 33 appears brightest. As shown in Fig. 2, eye point 38 is immediately behind rear wall 13 of camera body 11 when eyepiece 37 has the position shown and described hereinabove.

Prisms 34 and 35 and screen 33 are so positioned that the optical distance from lens 26 to screen 33, that is, the length of the path traversed by the image forming rays between lens 26 and screen 33, is equal to the optical distance from photographic objective 22 to focal plane 12—12. Because of the folded path of the light rays between lens 26 and screen 33 (see Fig. 3), screen 33 is in front of focal plane 12—12. This makes possible the convenient position of eyepiece 37 within rear wall 13 of camera body 11. Without the use of prisms or other light beam bending means between lens 26 and screen 33, screen 33 would have to be placed in plane 12—12, and eyepiece 37 would have to be mounted at some position behind rear wall 13 of camera body 11.

Use of the prisms 34 and 35 between lens 26 and screen 33 has the further advantage that only light rays whose direction does not differ greatly from the direction of the optical axis of lens 26 are directed to screen 33. Thus even though no bellows or other light excluding means are used between lens 26 and opening 29 in the front wall of housing 28, very little stray light reaches screen 33 while, at the same time, the fact that lens 26 is detached from housing 28, and therefore from camera body 11, results in certain advantages which will be pointed out hereinbelow.

To focus camera 10 on any object, lens 26 is moved into operative position in alignment with opening 29, and the image which is formed on screen 33 is examined by the photographer through eyepiece 37. Due to the fact that this image is erected and righted by Porro prisms 34 and 35 it is easy to focus lens 26 on the desired object even though only a small part of the object is imaged on screen 33. Moreover, the image on screen 33 is bright and easy to observe since, as was explained hereinabove, very little stray light reaches screen 33. Lens board 21 is moved towards and away from focal plane 12—12 until the position thereof is found for which the image on screen 33 appears most sharply defined. Since the image on screen 33 is examined through the magnifying eyepiece 37, this position can be determined with great accuracy. The camera 10 is then correctly focused on the object since, due to the equality of the focal lengths of lens 26 and photographic objective 22 and the equality of the optical distances from lens 26 to screen 33 and from photographic objective 22 to focal plane 12—12, the image of the object formed by photographic objective 22 in focal plane 12—12 is also most sharply defined for the same position of lens board 21.

It is advantageous to give to lens 26 a relatively large aperture because the depth of focus of lens 26 is then small so that the camera is focused more critically by examining the image formed on screen 33. At the same time, because of the relatively small size of screen 33, the image formed by lens 26 need be sharp only near its axis, so that lens 26 must be corrected only for spherical and chromatic aberration. Lens 26 thus may be of simple and therefore cheap construction even when its aperture is large. When, for example, lens 26 has an aperture f/4.5 and eyepiece 37 has a magnifying power of ten, it is found that the camera can be focused very quickly and accurately. However, satisfactory results can be obtained with a wide range of values of both the aperture of lens 26 and the magnifying power of eyepiece 37, and the invention is by no means limited to the values given hereinabove by way of example only.

A preferred embodiment of the camera focusing device is obtained by substituting prism 40 (see Fig. 4) for prism 35. Prism 40 differs from prism 35 only in that the half 41 of its hypotenuse face is ground. The prisms 34 and 40 are arranged in housing 28 in alignment with lens 26, that is, so that they direct light passing through lens 26 and opening 29 to opening 30. Ground portion 41 is the portion of the prism face farthest from lens 26 and the optical distance from lens 26 to ground portion 41 is made equal to the optical distance from photographic objective 22 to focal plane 12—12. With this arrangement, ground portion 41 becomes the image receiving screen and screen 33 is omitted. Eyepiece 37 is now used to examine ground portion 41 and the image formed thereon. The camera focusing device thus becomes even more compact than is the case when screen 33 is employed.

Prisms 34 and 35 have been shown in Figs. 2 and 3 as separated from each other. However, prisms 34 and 35 or prisms 34 and 40 may also be arranged with their hypotenuse faces in contact, this arrangement having the advantage that there are then less reflecting surfaces in the path of light through the focusing device so that the image formed on screen 33 or ground portion 41 is brighter.

Lens 26 has been shown and described hereinabove as mounted in lens holder 25 which is pivotally attached to lens board 21 by the pivot 27. With this arrangement, lens 26 can be moved from its operative position into the storable position indicated by the dotted lines in Fig. 1, in which it can be carried by lens board 21 to a position within camera body 11 when the camera is folded. The fact that focusing lens 26 is detached from the camera body thus makes it possible for the focusing device of the invention to be easily incorporated in the design of a folding camera of the type shown in Figs. 1 and 2 without appreciably increasing the size of the camera and without interfering with the folding of the camera.

Though the pivoted mounting of lens 26 on lens board 21 described hereinabove is convenient, the focusing device of the invention will operate effectively also when lens 26 is carried by lens board 21 in any other manner whereby it is supported for operation substantially in the plane of photographic objective 22 and in alignment with opening 29 in the front wall of housing 28, or whereby it is movable into this position.

Focusing devices in accordance with the present invention are particularly well adapted to focus cameras which employ interchangeable photographic objectives differing in focal length and mounted on lens boards that are detachable from the camera as is lens board 21 shown in Fig. 1. This again results from the fact that focusing lens 26 is detached from the camera body since focusing lens 26 is the only element of the focusing device that must be changed when a photographic objective differing in focal length from objective 22 is substituted therefor. Thus it is merely necessary to mount on each lens board used with such a camera a focusing lens having the same focal length as the photographic objective mounted thereon. Each focusing lens is mounted on its lens board so that when the lens board is attached to the camera in operative position, the focusing lens can be supported substantially in the plane of the photographic objective and in alignment with the rest of the focusing device. The focusing device can then be used to focus the camera when any one of the interchangeable objectives is substituted for objective 22. Moreover, the very act of changing photographic objective 22 by substituting for lens board 21 another lens board on which is mounted a photographic objective differing in focal length from objective 22 results in the substitution for focusing lens 26 of an appropriate focusing lens. With this focusing device there is thus no possibility of focusing the camera incorrectly due to oversight on the part of the photographer when he changes photographic objectives.

Housing 28 has been shown in Fig. 1 as being supported in a corner of camera body 11. Housing 28 may, however, occupy any other position within camera body 11 in which it does not interfere with the formation of an image on the sensitized element. In other embodiments of the invention housing 28 may be omitted if other means are provided for supporting Porro prisms 34 and 35 and screen 33, or Porro prisms 34 and 40 within camera body 11.

A modification of the focusing device for use with revolving back cameras is shown in Figs. 5 and 6. The camera of Fig. 5 differs from that of Figs. 1 and 2 in that its back 43 can be revolved through 90 degrees with respect to the camera body 44. The sensitized element whose shape is indicated by the dotted rectangle 45 (see Fig. 6) is supported by revolving back 43 in the focal plane of the camera. The fact that revolving back 43 can be turned through 90 degrees with respect to camera body 44 permits the taking of pictures with the long side of the sensitized element either vertical or horizontal without rotating the camera as a whole.

In other respects the camera of Fig. 5 is similar to the camera of Figs. 1 and 2, and like parts are given the same reference numerals. The housing 28 having the opening 29 in its front wall and the opening 30 in its rear wall is supported in camera body 44 in front of revolving back 43. Lens 26 having the same focal length as objective 22 is again supported by means of lens holder 25 on lens board 21 for operation substantially in the plane of objective 22 and in alignment with opening 29. Screen 33 is again mounted in housing 28 parallel to and in front of the focal plane of the camera, which is in the revolving back 43 thereof, and Porro prisms 34 and 35 again serve to direct light from lens 26 to screen 33 and to erect and right the image formed thereon. The optical distance from lens 26 to screen 33 is again made equal to that from photographic objective 22 to the focal plane of the camera. Eyepiece 37 through which screen 33 is examined is mounted in the opening 37b in revolving back 43 in alignment with opening 30 in the rear wall of housing 28.

The focusing device can now be used for focusing the camera as described hereinabove by examining the image on screen 33 through eyepiece 37. The eyepiece 46 (see Fig. 6), which is a duplicate of eyepiece 37, is mounted in revolving back 43 in such a position that when back 43 is revolved through 90 degrees in the direction indicated by the arrow 47, eyepiece 46 is moved into alignment with opening 30 in the rear wall of housing 28 so that screen 33 can be examined through it. The camera focusing device is thus immediately ready for use with either position of the revolving back.

As described hereinabove in connection with the focusing device shown in Fig. 2, Porro prisms 34 and 35 may have an orientation other than that shown in Fig. 5 provided that they direct light from lens 26 to screen 33 and erect and right the image formed thereon.

Housing 28 may again be omitted if means are provided for supporting Porro prisms 34 and 35, and screen 33 within camera body 44.

Prism 35 may again be replaced by prism 40 (Fig. 4) in which case the optical distance from lens 26 to ground portion 41 is made equal to that from photographic objective 22 to the focal plane of the camera and screen 33 is omitted.

The focusing devices described and shown hereinabove are of the type which is built into a camera. A focusing device which can be attached to a camera is shown in Figs. 7 to 9. The casing 50 is adapted to be attached to a camera body 51 by suitable means such as the lugs 52 and the screws 53. Light may enter casing 50 through the opening 55 in its front wall. Within casing 50 the Porro prisms 34 and 35 direct the entering light to the screen 33 which is positioned so that it is parallel to the focal plane of the camera when casing 50 is attached to camera body 51. Mounted in the opening 37c in the rear wall of casing 50 is the magnifying eyepiece 37 through which screen 33 can be examined.

The focusing device of Figs. 7 to 9 is again designed for use with cameras of the type shown in Figs. 1, 2, and 5, in which the objective 22 is mounted on a lens board 21 that is movable towards and away from the camera focal plane. Focusing lens 26 having the same focal length as objective 22 is again mounted on lens board 21 in some suitable manner such as is shown by way of example in Fig. 9 where lens 26 is held in lens holder 57 which is attached to lens board 21 by the hinges 58. Lens 26 is thus movable into a position in which it is supported for operation substantially in the plane of photographic objective 22.

Lens holder 57 and casing 50 are attached to lens board 21 and camera body 51, respectively, in such relative position that when lens 26 is in operative position it is in alignment with opening 55 in casing 50 and so that the optical distance from lens 26 to screen 33 is equal to that from photographic objective 22 to the focal plane of the camera.

To focus the camera on a particular object, the image formed by lens 26 on screen 33 is examined through magnifying eyepiece 37. Lens board 21 is moved until the position is found for which the image on screen 33 is most sharply defined. The camera is then correctly focused on the object.

Prism 40 (Fig. 4) may be substituted for prism 35 in the focusing device of Figs. 7 to 9 just as in the case of the focusing device of Figs. 1 to 3. When this is done, screen 33 is again omitted since its function is performed by the ground portion 41 of prism 40. The Porro prisms 34 and 40 are arranged so that their hypotenuse faces are parallel to the focal plane of the camera when casing 50 is attached to the camera body and so that ground portion 41 of prism 40 is the portion of the prism face farthest from opening 55 along the optical path. When lens 26 is in operative position and casing 50 is attached to the camera body, the optical distance from lens 26 to ground portion 41 is equal to that from objective 22 to the focal plane of the camera.

Lens holder 57 can be folded against lens board 21 so that when the focusing device of Figs. 7 to 9 is attached to a folding camera of the type shown in Figs. 1, 2, and 5, for example, lens 26 is again movable into a storable position in which it can be carried by lens board 21 to a position within the camera body. Upon opening the camera it is necessary only to turn lens holder 57 about hinges 58 until it occupies the position shown in Fig. 9 in order to prepare the focusing device for operation.

In the focusing devices shown and described hereinabove, the image formed by the focusing lens is erected and righted by a pair of Porro prisms. Other plane reflecting means such as, for example, suitably located plane mirrors can also be used to accomplish the same result provided that these reflecting means are positioned so as to make the optical distance from the focusing lens to screen 33 or its equivalent equal to the optical distance from the photographic objective to the focal plane of the camera.

The focusing devices have been shown and described as applied to folding cameras. They may, however, be used for focusing any camera in which the photographic objective is mounted on a lens board which is movable towards and away from the focal plane of the camera.

Other modifications will readily suggest themselves to those skilled in the art.

What is claimed is:

1. In a camera which has a camera body, a revolving back adapted to support a sensitized element in the focal plane of said camera, said revolving back being substantially the entire back of the camera, a lens board movable towards and away from said focal plane, and a photographic objective mounted on said lens board, a focusing device including a screen supported within said camera body parallel to and in front of said focal plane, said screen being small compared to said sensitized element; a lens having the same focal length as said photographic objective and supported by said lens board for operation substantially in the plane of said photographic objective, said lens being detached from said camera body; a pair of Porro prisms supported within said camera body for directing light from said lens to said screen, said screen and said prisms being positioned so that the optical distance from said lens to said screen is equal to the optical distance from said photographic objective to said focal plane; a first magnifying eyepiece in said revolving back for examining said screen, and a second magnifying eyepiece in said revolving back and in such a position that, when said back is revolved, said screen can be examined through said second magnifying eyepiece.

2. In a camera which has a camera body, a revolving back adapted to support a sensitized element in the focal plane of said camera, said revolving back being substantially the entire back of the camera, a lens board movable towards and away from said focal plane, and a photographic objective mounted on said lens board, a focusing device including a lens having the same focal length as said photographic objective and supported by said lens board for operation substantially in the plane of said photographic objective, said lens being detached from said camera body; a pair of Porro prisms supported within said camera body in alignment with said lens, the portion of the prism face farthest from said lens being ground and the optical distance from said lens to said ground portion being equal to the optical distance from said photographic objective to said focal plane; a first magnifying eyepiece in said revolving back for examining said ground portion; and a second magnifying eyepiece in said revolving back and in such a position that, when said back is revolved, said screen can be examined through said second magnifying eyepiece.

3. In a camera which has a camera body, a revolving back adapted to supoprt a sensitized element in the focal plane of said camera, said revolving back being substantially the entire back of the camera, a lens board movable towards and away from said focal plane, and a photographic objective mounted on said lens board, a focusing device including a housing supported within said camera body, said housing having an opening in its front wall and an opening in its rear wall; a lens having the same focal length as said photographic objective and supported by said lens board for operation substantially in the plane of said photographic objective and in alignment with said opening in the front wall of said housing, said lens being detached from said housing; a pair of Porro prisms in said housing for directing light from said lens to said opening in the rear wall of said housing, the portion of the prism face farthest from said lens being ground and the optical distance from said lens to said ground portion being equal to the optical distance from said photographic objective to said focal plane; a first magnifying eyepiece in said revolving back in alignment with said opening in the rear wall of said housing for examining said ground portion; and a second magnifying eyepiece mounted in said revolving back in such a position that, when said back is revolved, said second magnifying eyepiece is moved into alignment with said opening in the rear wall of said housing.

JOHN A. MAURER, Jr.